March 14, 1967  A. GABOR ETAL  3,309,597
MOTOR ACCELERATION CONTROL SYSTEM
Filed April 20, 1964
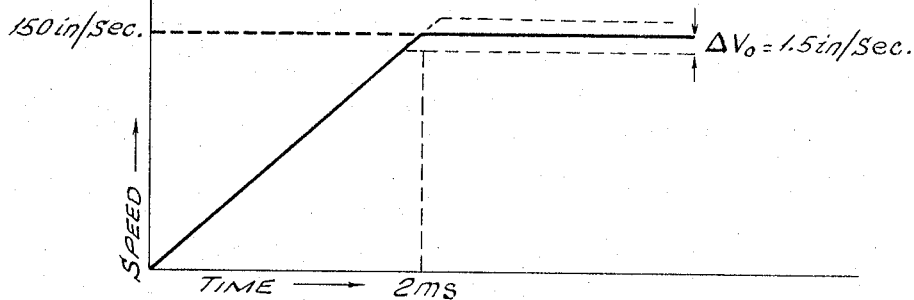
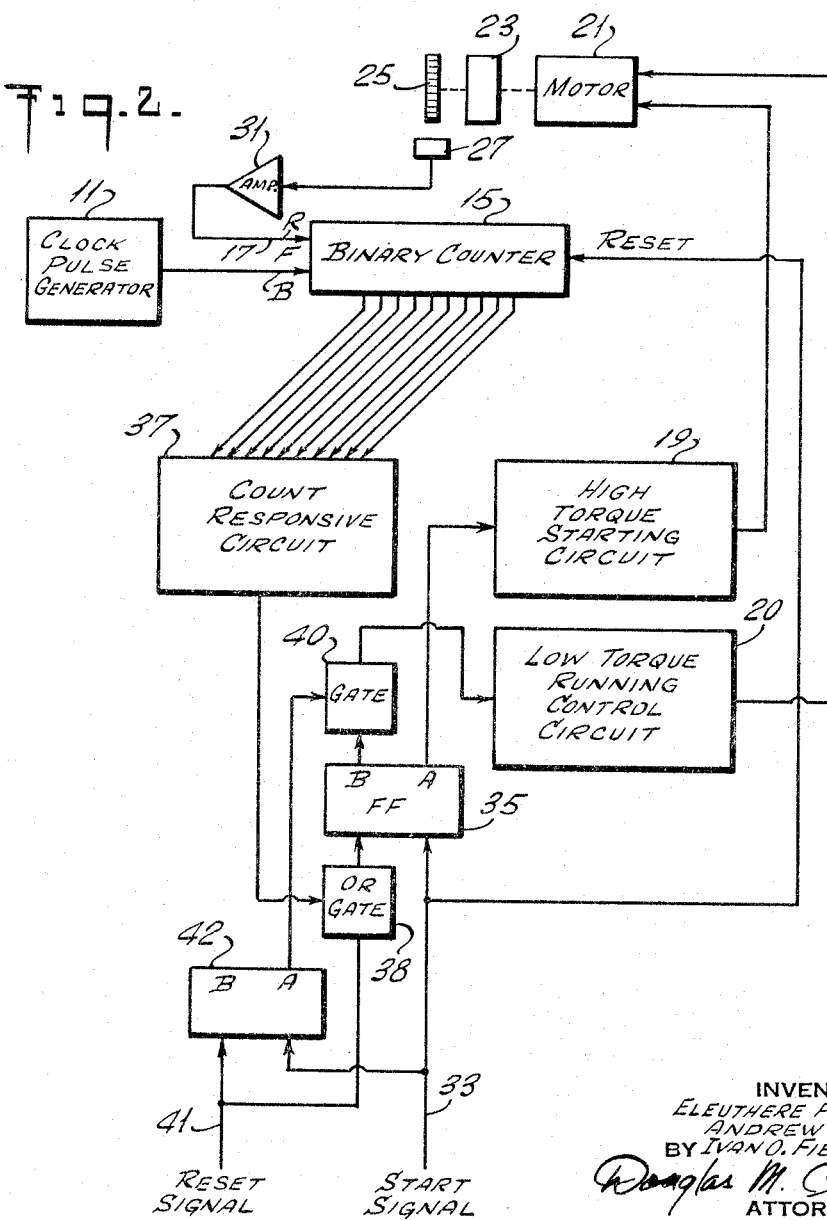
INVENTORS
ELEUTHERE POUMAKIS
ANDREW GABOR
BY IVAN O. FIELDGATE
Douglas M. Clarkson
ATTORNEY United States Patent Office 3,309,597
Patented Mar. 14, 1967

3,309,597
MOTOR ACCELERATION CONTROL SYSTEM
Andrew Gabor, Huntington, Ivan O. Fieldgate, Halesite, and Eleuthere Poumakis, East Islip, N.Y., assignors to Potter Instrument Company, Inc., Plainview, N.Y., a corporation of New York
Filed Apr. 20, 1964, Ser. No. 361,179
6 Claims. (Cl. 318—393)

This invention relates to motor speed control systems and, more particularly, to a system for controlling the acceleration of a capstan drive on a tape transport when the drive motor is started up from zero speed.

In digital tape transports, it is desirable that the capstan and the tape driven thereby reach their high operating or running speed in a very short time without overshooting the desired speed. For example, the operating speed may be 150 inches per second, which must be maintained with an accuracy of 1%, and when the capstan is started up from zero speed, it may be required to reach its operating speed within two milliseconds.

The time required for the capstan to reach its operating speed is referred to as the "rise" time. The requirement of the 1% accuracy means that the capstan must not overshoot the desired speed of 150 inches per second by more than 1.5 inches per second.

To achieve these objectives, the acceleration of the capstan must be controlled very accurately when started and particularly when it approaches the desired operating speed. The acceleration of the capstan could be controlled in response to the capstan or tape speed, and this control would be achieved normally by marks on a tone wheel driven by the capstan.

In order to achieve a two millisecond rise time to an operating speed of 150 inches per second without overshooting by more than 1.5 inches per second, the marks on the tone wheel in a velocity responsive control system would have to be $3 \times 10^{-3}$ inches apart, and the marks would have to be placed on the tone wheel with an accuracy or tolerance of $3 \times 10^{-5}$ inches, assuming that the tone wheel marks are at the radius of the capstan. The difficulty of achieving such a tolerance is apparent.

The present invention greatly alleviates these close tolerance requirements. According to the present invention, the acceleration is controlled in response to the total distance traveled and the elapsed time rather than in response to velocity. With the acceleration controlled in this manner, the marks on the tone wheel need be positioned with an accuracy of only $1.5 \times 10^{-3}$. Thus, the tolerance requirement is alleviated by factor 50.

A system in accordance with the present invention, first, energizes the capstan drive motor to apply a high torque to the capstan and, then, automatically reduces the torque to a lower value when the tone wheel and the capstan reach a desired speed. The lower torque, when achieved, is controlled in a conventional manner to maintain constant speed.

Even though the switch from the high torque to the low torque is made at the time that the tone wheel and the capstan reach the desired operating speed, it is not made directly in response to the tone wheel speed. Instead, the switch is in response to the count in a counter dropping to zero, which count is increased linearly with time and decreased linearly with distance traveled.

When a start signal is given, the counter will begin to count the pulses from a clock pulse generator which increases the count in the counter. The motor is controlled to apply a high torque to the capstan when the count in the counter is above zero. As a result, the motor driving the capstan will begin to accelerate.

A count of the marks on the tone wheel driven by the capstan is fed to the counter also, and the total registered by the counter now decreases by one in response to each pulse received from the tone wheel. Thus, the count in the counter will be proportional to the elapsed time minus the distance traveled by the tape.

At first, the count in the counter will increase due to the fact that the clock pulses are produced at a faster rate than the tone wheel pulses. As the capstan and the tone wheel accelerate, the tone wheel pulse rate will increase until the tone wheel pulse rate exceeds the clock pulse rate. When this condition occurs, the count in the counter will start to decrease and will decrease at an increasing rate due to the continued acceleration of the capstan and the tone wheel, until the count in the counter reaches zero.

In response to the count in the counter becoming zero, the system automatically changes the energization of the motor to apply a low torque to the capstan, which low torque is controlled in a conventional manner then to maintain a constant speed. The parameters of the system, such as the clock pulse rate, the distance between marks on the tone wheel, and the value of the high torque applied to the motor during the acceleration period, are selected so that the count in the counter drops to zero just when the capstan has accelerated to the desired operating speed. Because the control of the acceleration is in response to the distance traveled rather than speed, the tolerance requirements are greatly alleviated as described above.

Accordingly, an object of the present invention is to provide an improved motor speed control system.

Another object of the invention is to provide an improved speed control system for the capstan drive of a tape transport.

Still another object of the invention is to provide an improved system for controlling the acceleration of the motor as it starts up from zero speed.

A further object of the present invention is to provide an improved system for controlling the energization of a motor when it is started up so as to bring the motor up to the desired operating speed quickly without overshooting the desired operating speed.

A still further object of this invention is to provide an improved system for controlling the capstan drive of a tape transport when the capstan drive is started up so as to bring the capstan and magnetic tape driven thereby quickly up to the operating speed without overshooting.

Yet another object of this invention is to reduce the tolerance requirements in the tone wheel used for controlling the speed of the capstan drive.

Still a further object of this invention is to reduce the problem of overshooting in a capstan drive system for tape transports.

One of the important objects of this invention is to facilitate the bringing of the magnetic tape capstan drive quickly up to the desired operating speed without substantial overshoot.

Further objects and advantages of the present invention will become readily apparent as the following detailed description of the invention unfolds when taken in conjunction with the drawings, wherein:

FIG. 1 is a graph of an example of a desired speed profile for a magnetic tape drive system; and FIG. 2 is a schematic block diagram of a speed control system in accordance with the present invention.

The graph shown in FIG. 1 is an example of a desirable speed profile for a capstan and magnetic tape driven thereby upon starting up from zero speed. In the example illustrated, the tape reaches a speed of 150 inches per second in two milliseconds, and then, the speed is maintained constant at 150 inches per second. This constant speed should be maintained with a 1% accuracy, which means that the tape, upon accelerating to 150 inches per second, should not overshoot the speed of 150 inches per second by more than 1.5 inches per second. An acceleration to 150 inches per second in two milliseconds is an acceleration of $7.5 \times 10^4$ in./sec.$^2$.

If the acceleration is controlled in response to the capstan speed, then, in order to ensure that the speed does not overshoot by more than 1.5 inches per second, speed information must be obtained every 20 microseconds. This interval can be determined by dividing the permissible overshoot of 1.5 in./sec. by the required acceleration of $7.5 \times 10^4$ in./sec.$^2$.

If the speed information is supplied by a tone wheel driven by the capstan and having the same radius as the capstan, then the maximum distance between the marks can be determined by multiplying the operating or running speed by the 20 microsecond interval. Thus, the marks would have to be placed $3 \times 10^{-3}$ inches apart. In order for the speed information to have a 1% accuracy, the position error of each mark would have to be not more than $0.01 \times 3 \times 10^{-3} = 3 \times 10^{-5}$ inches.

However, if the acceleration is constant during the 2 millisecond rise time, the speed can be determined by dividing twice the distance of total tape travel by the time. In this equation, the absolute value of acceleration is of no consequence since it does not appear in the equation.

If the final tape speed is to be obtained with a 1% accuracy, it is necessary to measure the total distance traveled only within 1%. Since with constant acceleration the total tape travel is equal to the speed times the time divided by 2, the distance traveled during the 2 millisecond rise time will be equal to $$\frac{150 \times 2 \times 10^{-3}}{2} = 150 \times 10^{-3}$$

Accordingly, to know this distance with a 1% accuracy, the marks on the tone wheel need to be positioned with a tolerance of only $1.5 \times 10^{-3}$ inches. Hence, the tolerance requirement is alleviated by a factor of $$\frac{1.5 \times 10^{-3}}{3 \times 10^{-5}} = 50$$

This means that if the acceleration is maintained constant during the 2 millisecond rise time up to the speed of 150 inches per second and, then, is stopped by a signal operating in response to the distance that the tape has traveled, the tolerance requirements on the marks on the tone wheel are 50 times less stringent than they are when the acceleration is controlled in response to speed.

This concept can be extended to acceleration functions other than a constant acceleration, provided the form of the acceleration function is known. In the present invention, the acceleration is controlled in response to the distance of tape travel and the elapsed time, and thus, the invention greatly alleviates the tolerance requirements as described above.

As shown in FIG. 2, the system of the present invention includes a clock pulse generator 11, which is controlled internally by a crystal oscillator. The clock pulse generator 11 applies pulses at a constant frequency to an input 13 of a binary counter 15. The binary counter 15 counts in the forward direction in response to the pulses received from the clock pulse generator 11 and will count in the reverse direction in response to pulses applied to another input 17.

The counter 15 functions to establish a quantity which is changed in one direction in response to pulses applied to the input 13 and is changed in the opposite direction in response to pulses applied to the input 17. In addition, the binary counter 15 operates in conjunction with a high torque starting circuit 19 and a low torque running control circuit 20 to control the energization of a printed circuit motor 21, which drives a capstan 23 of a magnetic tape transport, so that during the time the capstan and the motor 21 are starting up from zero speed and are rising to the desired operating speed, the motor 21 applies a high torque to the capstan, and after the motor 21 and the capstan 23 reach the desired operating speed, the motor 21 applies a low torque to the capstan 23 and maintains a constant speed. The high torque starting circuit 19 may comprise any suitable circuit known to those skilled in the art such as a constant current or, alternatively, a constant voltage source, depending upon the characteristics of the motor 21. Similarly, the low torque running circuit 20 may comprise any suitable circuit known to those skilled in the art such as a control circuit employing the output of a tachometer coupled to the motor shaft to provide a feed back signal that varies the energization of the motor to maintain the speed of the motor constant.

The motor 21, in addition to driving the capstan 23, directly drives a tone wheel 25 so that the tone wheel rotates at the exact same speed as the capstan. The tone wheel 25 is provided with marks around its outer circumferential edge, which are converted into pulses by a "read" head 27, one pulse being produced for each mark on the tone wheel. These marks on the tone wheel may be magnetic, optical, or of any other convenient form which will generate output pulses.

The output pulses from the tone wheel produced by the read head 27 are amplified by an amplifier 31, then are applied to the input 17 of the binary counter 15, and are counted by the counter 15 in the reverse direction. The quantity established by the counter 15 thus is a function having a positive term, the magnitude of which increases with time, and a negative term, the magnitude of which increases with the distance through which the capstan 23 and tone wheel 25 have rotated.

When the motor 21 and the capstan 23 driven thereby are at rest and it is desired to bring the motor and capstan up to operating speed, a start signal is applied to an input 33. This start signal sets a flip-flop 35 in its "A" state and sets the count registered by the binary counter 15 to zero. On being set in its "A" state, the flip-flop 35 "enables" the high torque starting circuit 19, which energizes the motor 21 to apply a high torque to the capstan 23.

Since the motor 21 and the capstan 23 will be at rest when the start signal is applied, no pulses will be applied initially to the input 17 of the binary counter 15. However, the clock pulse generator 11 which produces pulses at a constant rate will be applying pulses to the input 13 of the binary counter so the count registered by the binary counter 15 will build up rapidly.

As a result of the high torque applied by the motor 21, the capstan 23 and the tone wheel 25 will start to rotate, and the rate of rotation will accelerate rapidly. When the tone wheel 25 starts to rotate, it will cause pulses to be generated by the read head 27. These pulses, after being amplified by the amplifier 31, will be applied to the input 17 of the binary counter 15, which will count these pulses and subtract the count from the total counted at the input 13. Thus, the pulses produced by the read head 27 will have the effect of reducing the count registered by the counter 15.

As the speed of the tone wheel 25 increases, the read head 27 will produce pulses at a faster and faster rate until the pulses applied to the input 17 occur at a greater rate than the pulses produced by the clock pulse generator 11. Until this time, the count registered by the binary counter 15 will have been increasing, but when the rate that the pulses are being produced by the tone wheel 25 surpasses the rate that the pulses are being produced by the clock pulse generator 11, the count registered by the counter 15 will start to decrease.

Signals representing the count registered by the counter 15 are applied to a count responsive circuit 37, which will produce an output signal in response to the count registered in the counter 15 becoming zero. Count responsive circuit 37 may conveniently comprise an AND gate with one input coupled to the logical zero (0) of each flip-flop of the counter 15. This output signal of the count responsive circuit 37 is applied through an OR gate 38 to reset the flip-flop 35 back to its "B" state. When the flip-flop 35 is reset to its "B" state, the high torque starting circuit 19 will be "disabled," and the flip-flop 35 will apply an "enabling" signal to the low torque running control circuit 20 through a gate 40, which will be enabled at this time.

The pulse rate produced by the clock pulse generator 11, the spacing between marks on the tone wheel 25, and the torque applied by the motor 21 when energized by the starting circuit 19 are selected so that the count registered by the counter 15 will drop to zero just when the capstan reaches the desired operating speed. Thus, the high torque starting circuit 19 will be "disabled" and the low torque running control circuit 20 will be "enabled" just when the capstan 23 reaches the desired operating speed. When the low torque running control circuit 20 is "enabled," it will energize the motor 21 to apply a low torque to the capstan 23 and will control the energization of the motor 21 to operate at constant speed in a convention manner.

Before the start signal is applied to the system, a reset signal is applied to the system at an input 41. This reset signal is applied to the flip-flop 35 through the OR gate 38 to ensure that it is in its "B" state before the start signal is applied, and also, this reset signal sets a flip-flop 42 in its "B" state. Then when the start signal is applied at the input 33, it sets the flip-flop 42 in its "A" state.

The flip-flop 42 will "enable" the gate 40 whenever it is in its "A" state. The gate 40 and the flip-flop 42 serve to prevent the low torque running control circuit from being "enabled" when the flip-flop 35 is in its "B" state prior to the application of the start signal to the input 33. After the start signal is applied, the flip-flop 42 will be switched to its "A" state so that the gate 40 will be "enabled" when the flip-flop 35 switches back to its "B" state in response to the count registered in the counter 15 dropping down to zero.

The mark spacing on the tone wheel 25, the output pulse frequency of the clock pulse generator 11, and the torque to be applied by the motor 21 when energized by the starting circuit 19 can be determined by making the assumption that the applied torque and the acceleration produced thereby is constant. This assumption will be sufficiently valid with a conventional energizing circuit so as to cause only a very small error in calculation. Any error in calculation due to a non-constant acceleration may be compensated for by altering the oscillator frequency as required. In fact, an acceleration which is far from constant can be accommodated by an appropriate change of frequency so long as the shape of the acceleration function is consistent.

The exact value of the frequency can be determined by experiment. For acceleration functions which are approximately constant, the frequency is approximately:

$$f = \frac{1}{2t_r\left(\frac{dVo}{Vo}\right)}$$

For a linear acceleration function, the frequency is:

$$f = \frac{1}{3t_r\left(\frac{dVo}{Vo}\right)}$$

If the acceleration is substantially constant, the required acceleration of the capstan driving surface can be determined from the following formula:

$$a = \frac{Vo}{t_r}$$

in which "$a$" is the required acceleration, $Vo$ is the desired operating speed of the capstan driving surface, and $t_r$ is the time interval in which the capstan must be accelerated to the desired operating speed.

Therefore, in order for the capstan to reach a speed of 150 inches per second in two milliseconds, it must accelerate at a rate of $$\frac{150}{2 \times 10^{-3}} \text{ in./sec.}^2 = 7.5 \times 10^4 \text{ in./sec.}^2$$

The starting circuit 19, therefore, must be set to energize the motor 21 to produce an acceleration of $7.5 \times 10^4$ in./sec.$^2$.

The spacing between the marks on the tone wheel can be determined from the following formula:

$$ds = \frac{VodVo}{a}$$

in which "$ds$" is the mark spacing on the tone wheel and $dVo$ is the permissible overshoot in velocity. Therefore, in order to obtain the velocity profile illustrated by the graph of FIG. 1 with an overshoot of not more than 1.5 inches per second, the spacing of the marks on the tone wheel must be $$\frac{150 \times 1.5}{7.5 \times 10^4} \text{ inches} = 3 \times 10^{-3} \text{ inches}$$

The clock pulse generator output pulse frequency can be determined from the following formula:

$$f = \frac{1}{2t_r\left(\frac{dVo}{Vo}\right)}$$

in which "$f$" is the unknown frequency. Therefore, to obtain the exemplary profile of FIG. 1 with an overshoot of not more than 1.5 inches per second, the pulse frequency should be $$\frac{1}{2 \times 2 \times 10^{-3}\left(\frac{1.5}{150}\right)} = 2.5 \times 10^4 \text{ pulses/sec.}$$

The above description is of a preferred embodiment of the invention and many modifications may be made thereto without departing from the spirit and scope of the invention, which is defined in the appended claims.

What is claimed is:

1. A speed control system comprising,
   a motor, and
   means to control the energization of said motor to initially generate a high torque and then to automatically reduce the torque generated by said motor to a lower value in response to a predetermined function reaching a predetermined value, said function having a first term increasing in magnitude linearly with time and a second term increasing in magnitude linearly with the distance through which the output of said motor has rotated, said first and second terms being of opposite signs, increases in the magnitude of said second term tending to change the value of said function toward said predetermined value.

2. A magnetic tape speed control system comprising,
   a capstan adapted to drive a magnetic tape,
   a motor connected to drive said capstan, and
   means to control the energization of said motor to initially apply a high torque to said capstan and then to automatically reduce the torque applied by said motor to said capstan to a lower value and to maintain the speed of said capstan constant in response to a predetermined function reaching a predetermined value, said function having a first term having a magnitude increasing linearly with time and a second term having a magnitude increasing linearly with the distance through which said capstan has rotated, said first and second terms being of opposite signs, increases in the magnitude of said second term tending to change the value of said function toward said predetermined value.

3. A system for accelerating a capstan from rest to a predetermined speed comprising, in combination, a motor for driving said capstan, means coupling said motor to said capstan, means for producing a pulse in response to the rotation of the capstan through a predetermined incremental distance, a counter, a clock pulse generator and means for coupling an output from said clock pulse generator to said counter for establishing a time interval, means for coupling an output from said pulse producing means to an input of said counter, means to energize said motor, means coupling an output of said counter to said motor energizing means, said motor energizing means responding to the count in said counter to energizing said motor to initially generate a high torque and then to automatically change the energization of said motor to reduce said torque generated thereby to a lower value when the count accumulated by said counter reaches a certain value that is a function of the interval of high torque energization and the incremental distance represented by each pulse counted.

4. A system as in claim 3 wherein said pulse producing means is a tone wheel.

5. A system as in claim 4 wherein said predetermined incremental distance is a function of a permissible variation in speed from said predetermined speed.

6. A system as in claim 5 wherein the output pulse frequency of said clock pulse generator is a function of said permissible variation in speed from said predetermined speed.

References Cited by the Examiner

UNITED STATES PATENTS

| | | | |
|---|---|---|---|
| 2,878,434 | 3/1959 | Brown | 318—28 |
| 3,007,098 | 10/1961 | Skrobisch | 318—391 X |
| 3,064,173 | 11/1962 | Breen et al. | 318—163 X |
| 3,206,665 | 9/1965 | Burlingham | 318—28 |
| 3,209,222 | 9/1965 | Holy | 318—162 |
| 3,218,532 | 11/1965 | Toscano | 318—18 |

ORIS L. RADAR, *Primary Examiner.*

G. SIMMONS, *Assistant Examiner.*